(12) United States Patent
Preston, III (10) Patent No.: US 9,709,280 B2
(45) Date of Patent: Jul. 18, 2017

(54) ADJUSTABLE HANGER AND METHOD FOR GAS TURBINE ENGINE EXHAUST LINER

(71) Applicant: Lon H. Preston, III, Hobe Sound, FL (US)

(72) Inventor: Lon H. Preston, III, Hobe Sound, FL (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 1208 days.

(21) Appl. No.: 13/668,735

(22) Filed: Nov. 5, 2012

(65) Prior Publication Data

US 2014/0123678 A1    May 8, 2014

(51) Int. Cl.
*F23R 3/60* (2006.01)
*F02C 7/20* (2006.01)
*F02K 1/80* (2006.01)
*F02K 1/82* (2006.01)

(52) U.S. Cl.
CPC .................. *F23R 3/60* (2013.01); *F02C 7/20* (2013.01); *F02K 1/80* (2013.01); *F02K 1/82* (2013.01); *F02K 1/822* (2013.01); *F05D 2230/642* (2013.01); *F05D 2260/31* (2013.01); *F23R 2900/00005* (2013.01); *F23R 2900/00016* (2013.01); *F23R 2900/00017* (2013.01); *Y10T 29/49323* (2015.01); *Y10T 29/49963* (2015.01)

(58) Field of Classification Search
CPC .. F23R 2900/00005; F23R 2900/00016; F23R 3/60; F23R 2900/00017; Y10T 29/49323; Y10T 29/49963; F02C 7/20; F02K 1/80; F02K 1/82; F02K 1/822; F05D 2230/642; F05D 2240/90; F05D 2260/31
USPC ........................................ 29/889.22; 60/800
See application file for complete search history.

(56) References Cited

U.S. PATENT DOCUMENTS

| | | | | |
|---|---|---|---|---|
| 1,358,106 | A * | 11/1920 | Payton | B60R 25/0222 70/221 |
| 2,938,342 | A * | 5/1960 | Lombard | F01D 9/065 60/796 |
| 5,088,279 | A * | 2/1992 | MacGee | F02C 7/20 60/226.1 |
| 7,975,488 | B2 * | 7/2011 | Farah | F02C 7/20 60/770 |
| 2007/0119182 | A1 * | 5/2007 | Czachor | F01D 25/28 60/796 |

* cited by examiner

*Primary Examiner* — Mark Laurenzi
*Assistant Examiner* — Wesley Harris
(74) *Attorney, Agent, or Firm* — Carlson, Gaskey & Olds, P.C.

(57) ABSTRACT

A hanger assembly includes a hanger having a threaded bore. A bushing is attached to an outer duct, and a rotator cooperates with the hanger so that the hanger may rotate relative to an inner duct. A bolt is received in the bushing and in the hanger.

20 Claims, 6 Drawing Sheets

ADJUSTABLE HANGER AND METHOD FOR GAS TURBINE ENGINE EXHAUST LINER

BACKGROUND

A gas turbine engine typically includes a fan section, a compressor section, a combustor section, a turbine section, in some configurations an augmenter section, and finally a nozzle, or exhaust, section. A liner extending aft of the turbine section typically referred to as an exhaust, augmentor or nozzle liner includes an inner liner exposed to hot exhaust gases. The inner liner is typically spaced from an outer structure with a plurality of hanger assemblies. The hanger assemblies are required to accommodate misalignment, complex shapes, large thermal growth differentials, significant pressure loads and high temperatures. Moreover, the hangers are positioned within a confined physical envelope that is difficult to access while accommodating relative movement within several planes simultaneously.

Accordingly, it is desirable to design and develop a reduced cost hanger that performs as desired in the harsh environment of the exhaust duct while also simplifying assembly and reducing cost.

SUMMARY

According to a non-limiting embodiment disclosed herein, a hanger assembly includes a hanger having a threaded bore, a bushing attaching to an outer duct, a rotator cooperating with the hanger so that the hanger may rotate relative to an inner duct, and wherein the bushing engages the hanger during assembly.

According to any claim provided hereinabove, the axle is fixedly attached to the hanger.

According to any claim provided hereinabove, the hanger includes a mechanism for rotating the hanger to a position vertical to the inner duct.

According to any claim provided hereinabove, the mechanism comprises an orifice in the hanger.

According to any claim provided hereinabove, the mechanism comprises a protrusion extending from the hanger.

According to any claim provided hereinabove, a tool engages the mechanism for rotating the member from a horizontal position to a vertical position.

According to any claim provided hereinabove, a tool holding the hanger center bore mechanism is in a vertical position.

According to any claim provided hereinabove, a bolt passes through the bushing and engages the threaded bore for fixing the bushing to the hanger.

According to a further non-limiting embodiment disclosed herein, a hanger assembly for a gas turbine engine includes a first duct disposed in the gas turbine engine, a second duct disposed within the first duct, a hanger having a bore, a bushing having a outer body, the bushing attaching to the first duct, a rotator disposed in the hanger so that the hanger may rotate relative to the second duct and, wherein the bushing engages the hanger during assembly.

According to any claim provided hereinabove, a bolt passes through the bushing and engages the bore for fixing the bushing to the hanger.

According to any claim provided hereinabove, the bushing includes torqueing holes therein for rotating the bushing.

According to any claim provided hereinabove, the hanger assembly includes mechanism for rotating the hanger to a position perpendicular to the second duct.

According to any claim provided hereinabove, the mechanism includes a tool for manipulating the hanger to a position perpendicular to the second duct.

According to any claim provided hereinabove, the first duct has an opening in the first duct, the opening attaching to the bushing; and through which the tool extends to manipulate the hanger to a position perpendicular to the second duct.

According to any claim provided hereinabove, an opening in the first duct attaches to the bushing and through which a first tool extends to manipulate the hanger to a position perpendicular to the second duct and a second tool extends to hold the hanger perpendicularly relative to the second duct.

According to a still further non-limiting embodiment disclosed herein, a method for installing a hanger assembly, includes the steps of providing a first duct and a second duct, providing a hanger having a bore, providing a bushing having a outer body, providing the hanger with a rotator so that the hanger may rotate relative to the second duct and, wherein the bushing engages the hanger during assembly.

According to any claim provided hereinabove, the method includes the steps of passing a bolt through the bushing and engaging the bore for fixing the bushing to the hanger.

According to any claim provided hereinabove, the method includes the steps of providing an opening in the first duct, inserting a first tool in the opening and manipulating the first tool to rotate the hanger to be in register with the opening.

According to any claim provided hereinabove, the method includes the steps of inserting a second tool into the opening, the second tool engaging the bore to maintain the hanger in register with the opening.

According to any claim provided hereinabove, the method includes the steps of sliding the bushing over the second tool.

According to any claim provided hereinabove, the method includes the steps of inserting the bushing into the opening until the bushing contacts the hanger and the axle is at a bottom of a slot in the bushing.

According to any claim provided hereinabove, the method includes the steps of removing the second tool.

According to any claim provided hereinabove, the method includes the steps of inserting the bolt into the bore in the hanger.

According to any claim provided hereinabove, the method includes the steps of withdrawing the bushing from the first duct until a gap between the hanger and the bushing is created that relates to a desired position of the axle in the slot.

According to any claim provided hereinabove, the method includes the steps of tightening the bolt.

According to any claim provided hereinabove, the method includes the steps of inserting the bushing into the opening until the bushing contacts the hanger and the axle is at a bottom of a slot in the bushing.

According to any claim provided hereinabove, the method includes the steps of inserting the bolt into the bore in the hanger.

According to any claim provided hereinabove, the method includes the steps of withdrawing the bushing from the first duct until a gap between the hanger and the bushing is created that relates to a desired position of the axle in the slot.

These and other features disclosed herein can be best understood from the following specification and drawings, the following of which is a brief description.

DETAILED DESCRIPTION

Figure 1:
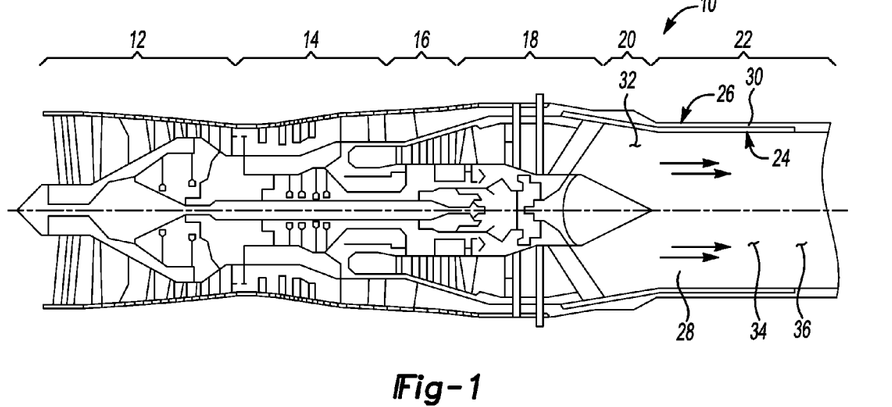
FIG. 1 shows a cross-sectional view of a gas turbine engine in which a hanger assembly disclosed herein is used.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gases 28 and ignited to generate additional thrust. The exhaust gases 28 flow from the turbine section 18 and the augmenter section 20 through an exhaust and/or nozzle liner assembly 22.

The example exhaust liner assembly 22 includes a liner 24 (e.g., a first or second duct) that defines an inner surface exposed to the hot exhaust gasses 28. The liner 24 is supported by and within a duct 26 (e.g., a first or second duct) disposed radially outward of the liner 24. An annular space 30 is disposed between the liner 24 and the duct 26 for a cooling airflow. The example exhaust liner assembly 22 includes a first section 32, a second section 34, and third section 36. Each of the first, second and third sections 32, 34, 36 are movable relative to each other to provide a thrust vectoring function, and also undergo thermal expansion growth relative to duct 26. As appreciated, although the gas turbine engine 10 is disclosed and described by way of example, other configurations and architectures of gas turbine engines are within the contemplation of this disclosure and would benefit from the disclosures within this application.

Figure 2:
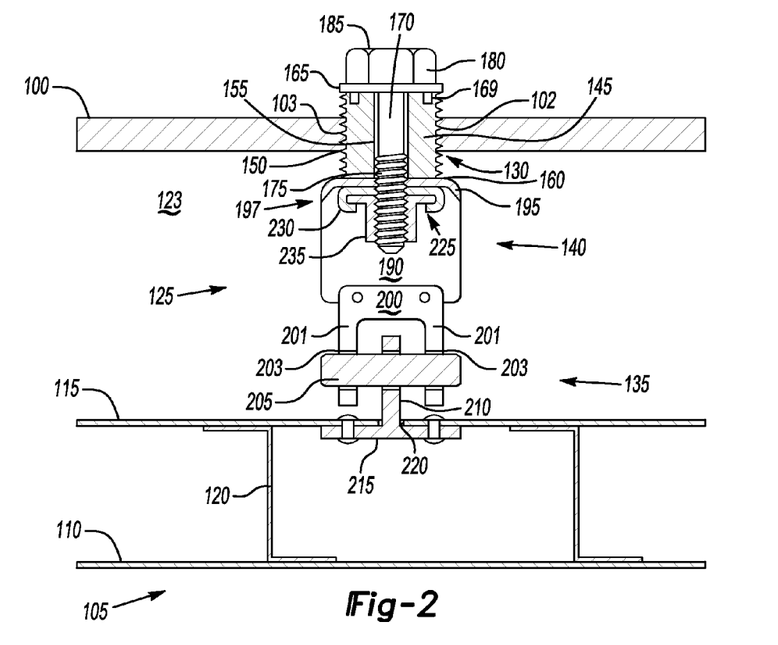
FIG. 2 shows an embodiment of a hanger assembly used with the gas turbine engine of FIG. 1.
Figure 3:
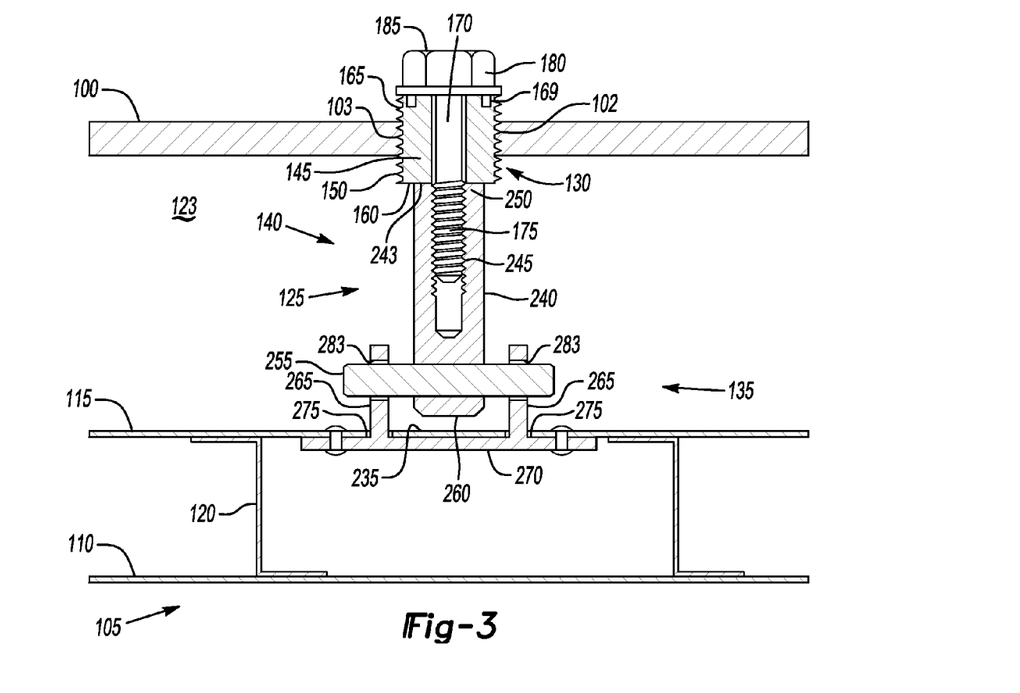
FIG. 3 is a further embodiment of a hanger that might be used with the gas turbine engine of FIG. 1.

Referring now to FIGS. 2 and 3, embodiments of a hanger assembly 125 are shown. The hanger assembly 125 is placed between the outer casing (or duct) 26/100 and the duct liner 24/105. The outer casing has an opening 103 which has threads disposed therein. Duct liner 24/105 has an inner duct liner 110 and an outer duct liner 115, and a plurality of supports 120 connecting the inner duct liner 110 and an outer duct liner 115. A ducted area 123 through which cooling air flows is disposed between the outer casing 26/100 and a duct liner 105.

The hanger assembly 125 has casing mount 130 attaching the hanger assembly 125 to the outer casing 100, a liner mount 135 attaching the hanger assembly 125 to the duct liner 105 and a hanger 140 attaching the casing mount 130 to the liner mount 135.

The casing mount 130 includes a bushing 145 having outer threads 150, an inner bore 155 that is smooth, a first end 160 in the area 123, and a second end 165 out of the area 123. The second end has a tool interface for installation which may be a flush head with internal torque holes 169 formed therein, or an external hexagonal head 167 (see FIG. 4). The embodiment shown in FIG. 4 does not include the torque holes 169 as will be discussed infra. The inner bore 155 is smooth and receives bolt 170 that has a threaded first end 175 for attaching to the hanger 140, a head 180 and a second end 185 coincident with the head 180.

Referring now to FIG. 2, the hanger 140 has a body 190 that is roughly rectangular and has a flange 195 extending from an upper end 197 at a right angle. A strap 200 is riveted to the body 190 as it is known in the art. The strap 200 has a pair of legs 201 extending downwardly therefrom. Each leg 201 has an opening 203 in which an axle 205 is fit therein. The axle 205 is inserted through the openings 203 so that the hanger assembly 125 attaches the inner case 105 to the outer casing 100. A single bearing 210 is attached integrally to a plate 215 that is attached to the outer duct liner 115. The bearing 210 extends through hole 220 in the outer duct liner 115 to minimize leakage therethrough. One of the bearing 210 or the legs 201 is fixedly attached to the axle 205 so the axle 205 may move axially relative to the hanger 140 or the inner duct 115 and circumferentially thereabout. The axle 205 forms a rotator about which hanger 240 may rotate to vertical as will be discussed infra. Other types of joints, such as a ball and socket, or the like may be used as s rotator.

The flange 195 attaching to the hanger body 190 has a slot 225 formed by brackets 230 in which a top hat threaded nut 235 receives bolt 170. Assembly of the hanger assembly 125 will be discussed herein.

Referring now to FIG. 3, hanger 240 is a linear member, which may be shaped like a cylinder or the like, has a first end 243 that engages the first end 160 of the bushing 145 as will also be discussed infra. The hanger 240 has a threaded bore 245 for cooperating with the bolt 170 and has a first end 250 that is open. An axle 255 is placed proximal to a second end 260 of the linear hanger 240. A pair of bearings 265 extends from a plate 270 riveted to the outer duct liner 115. Two holes 275 are placed in the outer duct liner 115 for receiving the bearings 265 that extend into the area 123 from plate 270. The bearings 265 are separated by a calculated distance that leaves a gap between the inside vertical faces of bearings 265 and hanger 240; as thermal expansion occurs, the liner 105 is thereby able to slide freely along axle 255 in the direction of expansion. Each of the bearings 265 holds a radially extending slot 283 as will be discussed infra.

Figure 4:
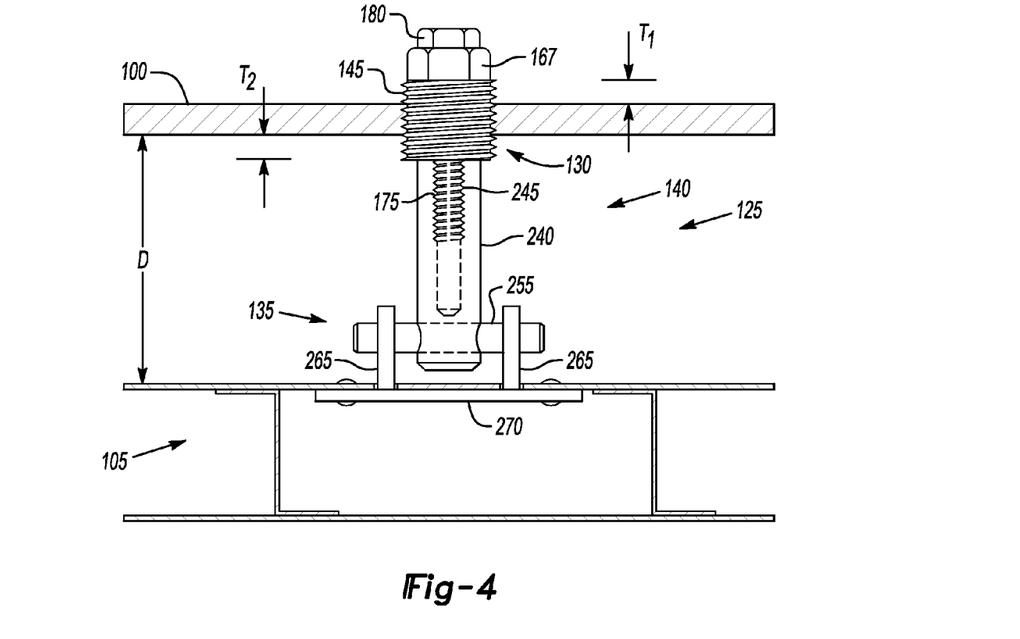
FIG. 4 is a perspective view of another embodiment of the hanger assembly of FIG. 3.

Referring now to FIG. 4, a typical installation of a hanger assembly 125 between outer casing 100 and duct liner 105 is shown. Typically the hanger (in this case hanger 240), the liner mount 135, and the casing mount 130 are made of standard parts having the same dimensions. However, during assembly it cannot be guaranteed that a distance between the outer casing 100 or the duct liner 105 will remain standard because of manufacturing tolerances and assembly. Moreover, though the parts, e.g., the casing mounting 130, the liner mount 135 or the hanger 140, are supposed to be standard there is frequently variation in the dimensions of the parts. Therefore, the sum of the tolerances of the variations in manufacturing and assembly are accounted for by utilizing hanger assembly 125 disclosed herein. By providing threaded bushing 145, the tolerances $T_1$ and $T_2$ may be accounted for by manipulating the bushing 145 and the bolt 170 to create a standardized assembly using the parts that may not be perfectly standard.

Figure 5:
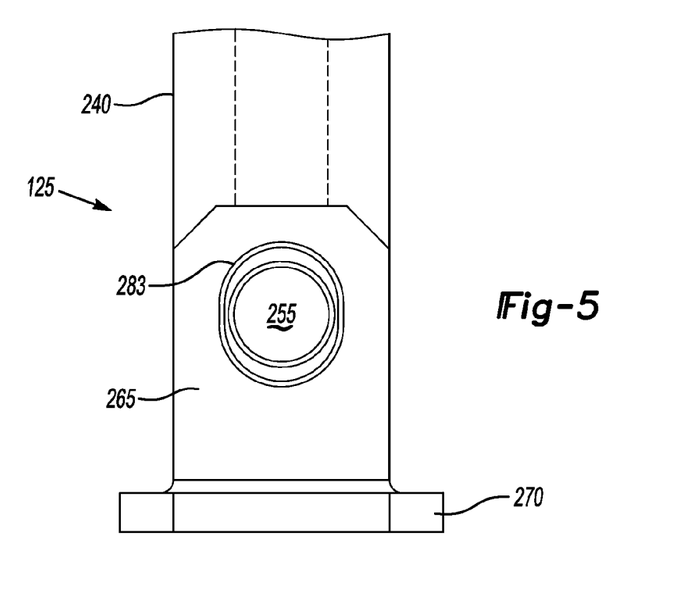
FIG. 5 is a side view of the liner mount of FIG. 4.

Referring now to FIG. 5, the bearing slots 283 in each bearing 265 are shown. The slots in the bearings 265 accommodate translational and rotational mismatches between the liner 105 and the casing 100 and are roughly elliptical. Moreover, the slots 283 are sized to account for any error caused by different coefficients of thermal expansion and allow as much movement as required radially and axially to account for tolerance accumulations of the outer casing 100, the liner 105 or the hanger assembly 125 itself.

Figure 6:
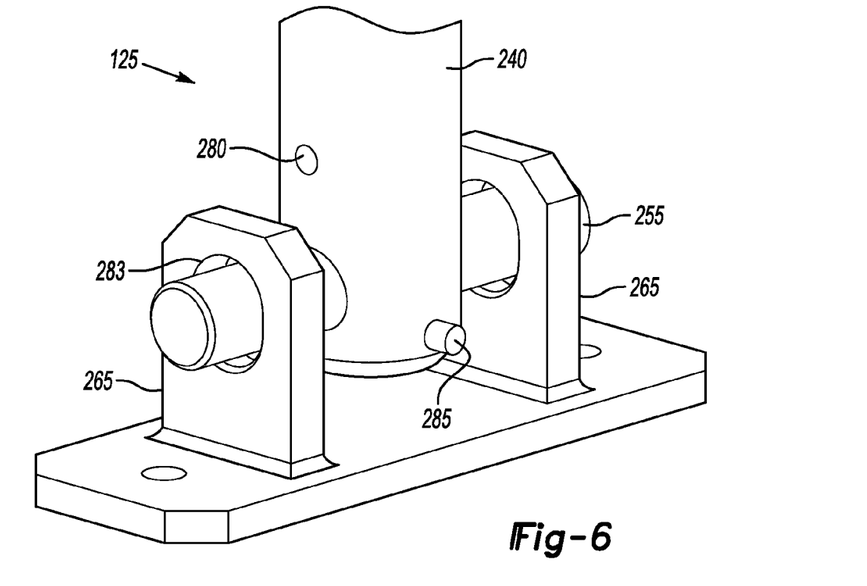
FIG. 6 is a perspective view of the liner mount of FIG. 4.
Figure 7:
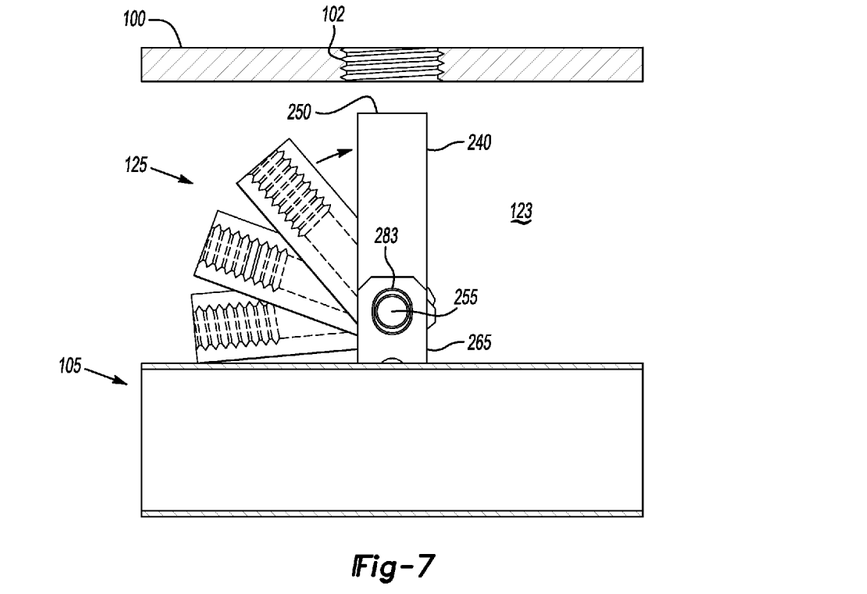
FIG. 7 is a side view showing a first step in the installation of the hanger assembly of FIG. 4.

During assembly of the liner and the duct it is typical to attach the liner mount 135 to outer duct liner 115 and the hanger 240 to the liner mount before the liner 105 is placed within the outer casing 100. Because the liner 105 is placed within the outer casing 100, it is difficult to access the hanger 240 because there is a plurality of hangers 240 and the area 123 is not very great so it is difficult to use a tool or a hand in the area 123. Because the axle 255 is free to rotate within the slots 283, the hanger 240 usually falls across the inner duct liner horizontally relative thereto. In order to get the hanger 240 perpendicular to the inner duct liner 105 to engage the casing mount 130, a mechanism must be provided to enable a user to do that. As shown in FIG. 6, an orifice 280 is placed in the hanger 240 in parallel to the axle 255. As an alternative, a stub 285 or other protrusion may extend from the hanger 240 proximal to the second end 260 thereof. As shown in FIG. 7, the hanger 240 through the rotation of the axle 255 in slots 283 moves the hanger 240 from almost parallel or horizontal to the duct liner 105 to perpendicular to the duct liner 105 and in line with the opening 102 in the outer casing 100. The mechanism may include the orifice 280, the stub 285 or any other thing a tool 295 or the like may engage to rotate the hanger 240 away from the inner duct liner 105.

Figure 8:
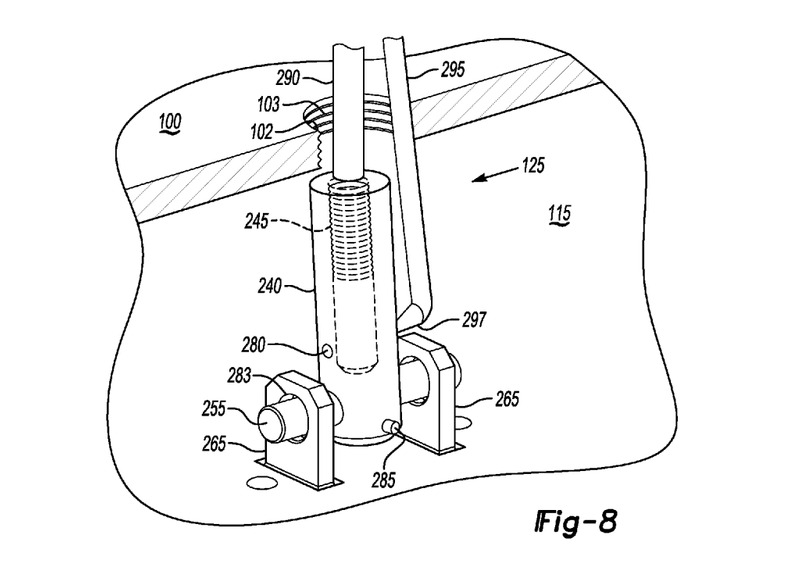
FIG. 8 is a perspective view partially in section of a tool used in the assembly of the hanger assembly of FIG. 4.
Figure 9:
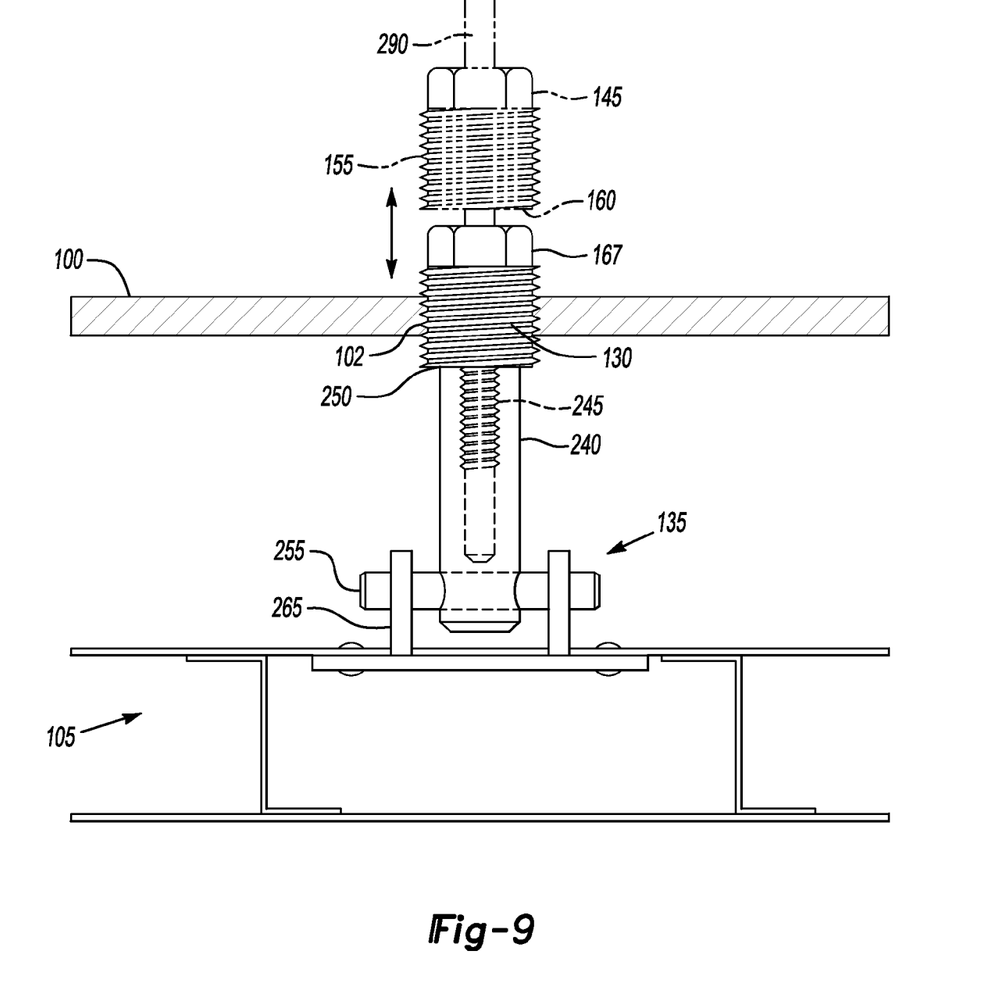
FIG. 9 indicates a further step in the assembly of the hanger assembly of FIG. 4.

Referring now to FIGS. 8 and 9, a methodology of assembly is shown. A manipulation tool 295 that has an angled end 297 is inserted in orifice 280 through the hole 102. The user then easily manipulates the hanger 240 to rotate the hanger 240 to a vertical position. A location tool 290 is inserted in the threaded bore 245 to hold the hanger 240 (or 140) vertically to prepare for attachment of the bushing 145 and the manipulation tool 295 is removed. As an alternative the angled end 297 of the manipulation tool 200 may also be impressed against the stub 285 to pivot the hanger 240 about its attached axle 255 that is enabled to rotate within the slots 283 so that the hanger 240 can be moved vertically from horizontal. The hanger 240 is in registration with the hole 102 so that the bushing 245 is aligned with the hanger 240 for point-to-point attachment thereto.

While the location tool is held in a vertical position, the bushing 145 is slipped over the location tool 290 until its outer threads 150 mesh with the threads 103 in the outer casing 100. The axle 255 may slide fore and aft within the slots 283 to account for axial misalignment. The hanger 240 may also rotate to account for circumferential misalignment about axle 255.

Referring now to FIG. 9, it is shown that the bushing 145 is threaded into the outer casing 100 by hand pressure using the hexagonal head 167 on the top the bushing. Threading is continued until the bushing 145 bottoms out onto the open first end 250 of the hanger 240. At this point, the bushing 145 is not torqued on the hanger 240 but only uses light pressure to prevent the hanger 240 from falling away if the location tool 290 is removed.

Figure 10:
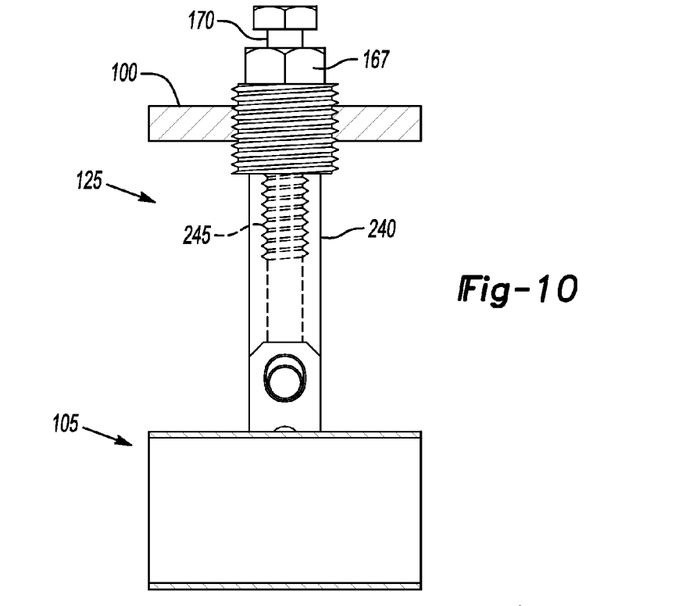
FIG. 10 is a still further step in the assembly of the hanger assembly of FIG. 4.
Figure 11:
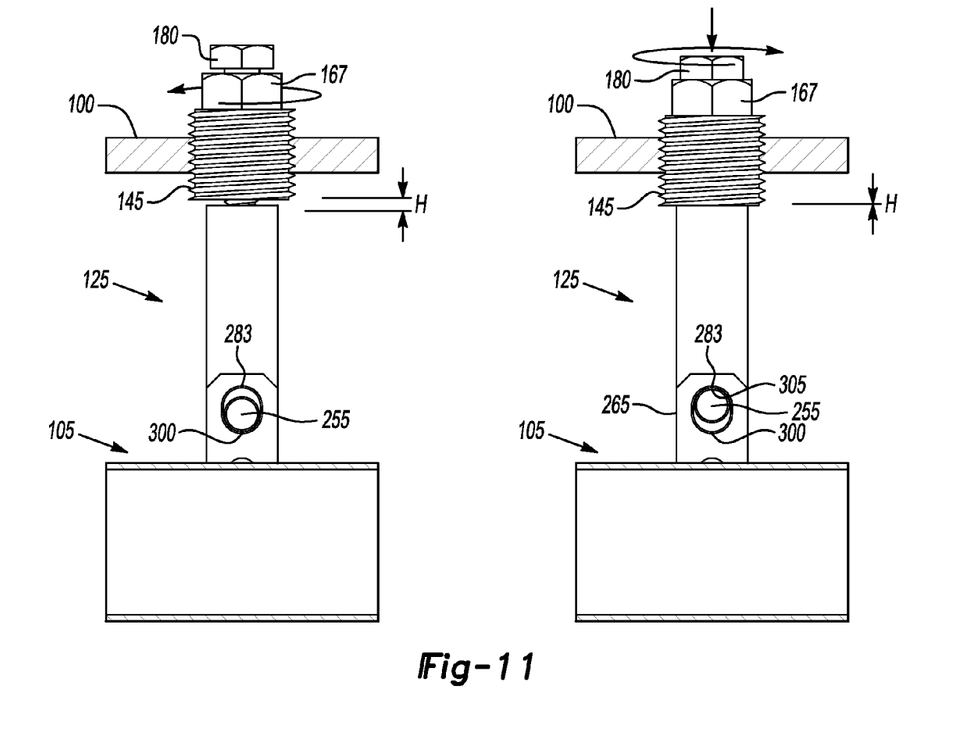
FIG. 11 shows two steps in the assembly of the hanger assembly of FIG. 4.

Referring now to FIGS. 10 and 11, bolt 170 is placed through the inner bore 155 of bushing 145 and partially tightened. Gap H is left between the head 167 and the head 180 of the bolt 170 to allow for vertical positioning of the hanger assembly 125 prior to final torqueing.

Referring now to FIG. 11, the position of final assembly is shown. Depending on expected engine loads and environments, it may be desirable to position the axle 255 at certain locations within vertical slots 283 of the brackets 255. By fractional turning of the bushing 145 the controlled gap H opens between the bushing 145 and the hanger 240. This gap H corresponds to a distance that the axle 255 extends from a bottom 300 of the slot 283. If the gap H is equal to a major length of the slot, the axle 255 will be positioned at a top 305 of the slot. Once the desired gap H is created by fractionally turning (or not turning) the bushing 145 after bottoming out, the bolt 170 is rotated by manipulating head 180, to close the gap H and leave the axle 255 at a desired location in the slot 283. The bolt 170 is then torqued to complete installation thereof.

Although an embodiment of this invention has been disclosed, a worker of ordinary skill in this art would recognize that certain modifications would come within the scope of this invention. For that reason, the following claims should be studied to determine the true scope and content of this invention.

I claim:

1. A hanger assembly, said hanger assembly comprising:
   a hanger having a threaded bore,
   a bushing having a threaded outer surface for attaching to an outer duct and having an inner bore,
   a rotator cooperating with said hanger so that said hanger is rotatable relative to an inner duct, and
   a bolt received in said inner bore and in said threaded bore.

2. The hanger assembly of claim 1, wherein said rotator comprises an axle fixedly attached to said hanger.

3. The hanger of claim 1, wherein said hanger is rotatable to a position vertical to said inner duct.

4. The hanger assembly of claim 3, comprising an orifice in said hanger for engaging with a tool for rotating to said vertical position.

5. The hanger assembly of claim 3, comprising a protrusion extending from said hanger for engaging with a tool for rotating to said vertical position.

6. The hanger assembly of claim 1 further comprising a tool holding said hanger in a vertical position.

7. The hanger assembly of claim 1,
   wherein said bolt passes through said bushing and engages said threaded bore for fixing said bushing to said hanger.

8. The hanger assembly of claim 1, wherein said threaded outer surface allows for vertical adjustment of the bushing.

9. The hanger assembly of claim 1, wherein said bushing includes torqueing holes therein for rotating said bushing.

10. The hanger assembly of claim 1, wherein said bushing abuts said hanger.

11. The hanger assembly of claim 10, wherein said rotator is an axle radially inward of the threaded bore.

12. A method for installing a hanger assembly, said method comprising:
   providing a first duct and a second duct;

providing a hanger having a bore;
providing a bushing having an outer body;
providing said hanger with a rotator so that said hanger is rotatable relative to said second duct; and
providing an opening in said first duct;
inserting a first tool in said opening;
manipulating said first tool to rotate said hanger to be in register with said opening; and
inserting a second tool into said opening, said second tool engaging said bore to maintain said hanger in register with said opening.

13. The method of claim 12 further comprising:
passing a bolt through said bushing and engaging said bore for fixing said bushing to said hanger, wherein said bore and said bolt are threaded.

14. The method of claim 13 further comprising:
sliding said bushing over said second tool.

15. The method of claim 14 further comprising:
inserting said bushing into said opening until said bushing contacts said hanger;
removing said second tool;
inserting said bolt into said bore in said hanger;
withdrawing said bushing from said first duct until a gap between said hanger and said bushing is created that relates to a desired position of said rotator; and
tightening said bolt.

16. An exhaust liner assembly comprising:
a duct liner;
a casing radially outward of said liner and having a threaded opening;
a hanger having a threaded bore;
a bushing having a threaded outer surface for attaching to said threaded opening of said casing and having an inner bore, wherein said bushing abuts said hanger;
a rotator radially inward of said threaded bore and cooperating with said hanger so that said hanger is rotatable relative to said duct liner, and
a bolt received in said inner bore and in said threaded bore.

17. The exhaust liner assembly of claim 16, comprising a plate fixed to the duct liner, the plate including at least one bearing having a slot configured to receive the rotator.

18. The exhaust liner assembly of claim 17, wherein said rotator is an axle.

19. The exhaust liner assembly of claim 18, wherein the plate is fixed to a radially inner surface of the duct liner, and the duct liner includes at least one hole for receiving the at least one bearing.

20. The exhaust liner assembly of claim 19, wherein the slot is elliptical.

* * * * *